United States Patent
Norimatsu et al.

(10) Patent No.: US 7,254,644 B2
(45) Date of Patent: Aug. 7, 2007

(54) COMMUNICATION METHOD AND SYSTEM FOR TRANSMISSION AND RECEPTION OF PACKETS COLLECTING SPORADICALLY INPUT DATA

(75) Inventors: Takashi Norimatsu, Tenryu (JP); Takashi Ubayama, Hamakita (JP); Koichi Kaneko, Iwata (JP); Akiho Tamura, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 617 days.

(21) Appl. No.: 10/021,939

(22) Filed: Dec. 13, 2001

(65) Prior Publication Data
US 2002/0078245 A1   Jun. 20, 2002

(30) Foreign Application Priority Data
Dec. 19, 2000  (JP)  ............... 2000-385691

(51) Int. Cl.
*G06F 15/16*  (2006.01)
*G06F 15/173*  (2006.01)
*G06F 17/00*  (2006.01)

(52) U.S. Cl. .............. 709/248; 709/223; 709/236; 700/94; 84/645

(58) Field of Classification Search .......... 370/351; 709/248; 84/604–609
See application file for complete search history.

(56) References Cited

U.S. PATENT DOCUMENTS

| | | | | |
|---|---|---|---|---|
| 5,198,603 A | * | 3/1993 | Nishikawa et al. | 84/601 |
| 5,266,736 A | * | 11/1993 | Saito | 84/612 |
| 5,286,907 A | * | 2/1994 | Okamura et al. | 434/307 A |
| 5,300,725 A | * | 4/1994 | Manabe | 84/609 |
| 5,339,311 A | * | 8/1994 | Turner | 370/394 |
| 5,670,732 A | * | 9/1997 | Utsumi et al. | 84/645 |
| 5,886,277 A | * | 3/1999 | Takauji | 84/604 |

(Continued)

FOREIGN PATENT DOCUMENTS

JP   SHO 63-2439   1/1988

(Continued)

OTHER PUBLICATIONS

Jung, Byungdae et al., Incorporating Co-presence in Distributed Virtual Music Environments (2000), ACM Press New York, NY, USA, Proceedings of the ACM symposium on Virtual reality software and technology, pp. 206-211,ISBN:1-58113-316-2.*

*Primary Examiner*—Bunjob Jaroenchonwanit
*Assistant Examiner*—Dohm Chankong
(74) *Attorney, Agent, or Firm*—Pillsbury Winthrop Shaw Pittman LLP

(57) ABSTRACT

A server/client system provides packet communications between a server and a client by way of a network such as the Internet. The server inputs data such as MIDI data in a sporadic manner while storing timing data representing their input timings. Then, the server performs packetizing of the sporadically input data, which accompany the timing data and are subjected to transmission to the client. The client receives the packetized input data and then outputs them at timings based on the timing data. Thus, it is possible to completely secure the same time relationship of data during transmission and reception of the sporadically input data even though the client differs from the server on a time-axis basis.

23 Claims, 6 Drawing Sheets

U.S. PATENT DOCUMENTS

| | | | |
|---|---|---|---|
| 5,902,949 A * | 5/1999 | Mohrbacher | 84/609 |
| 5,941,936 A * | 8/1999 | Taylor | 704/503 |
| 6,175,872 B1 * | 1/2001 | Neumann et al. | 709/231 |
| 6,248,945 B1 * | 6/2001 | Sasaki | 84/604 |
| 6,653,545 B2 * | 11/2003 | Redmann et al. | 84/615 |
| 6,757,303 B1 * | 6/2004 | Kikuchi et al. | 370/509 |
| 6,782,299 B1 * | 8/2004 | Tsuji et al. | 700/94 |
| 6,798,829 B1 * | 9/2004 | Imai et al. | 375/222 |
| 6,816,492 B1 * | 11/2004 | Turner et al. | 370/394 |
| 6,876,670 B1 * | 4/2005 | Budrikis et al. | 370/474 |

FOREIGN PATENT DOCUMENTS

| | | |
|---|---|---|
| JP | 9-312669 | 12/1997 |
| JP | 10-32606 | 2/1998 |
| JP | 11-190993 | 7/1999 |
| JP | 11-252125 | 9/1999 |
| JP | 11-282461 | 10/1999 |

* cited by examiner

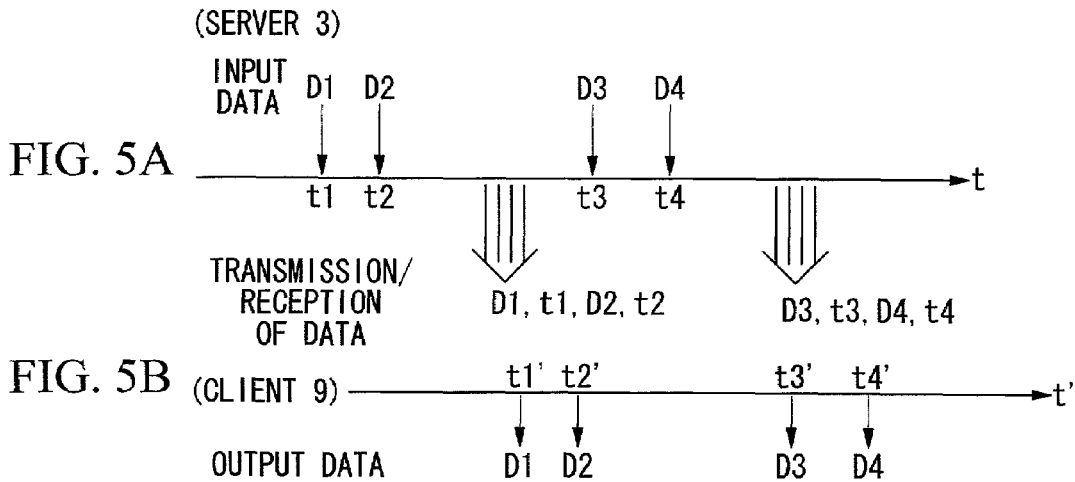
FIG. 5A
FIG. 5B
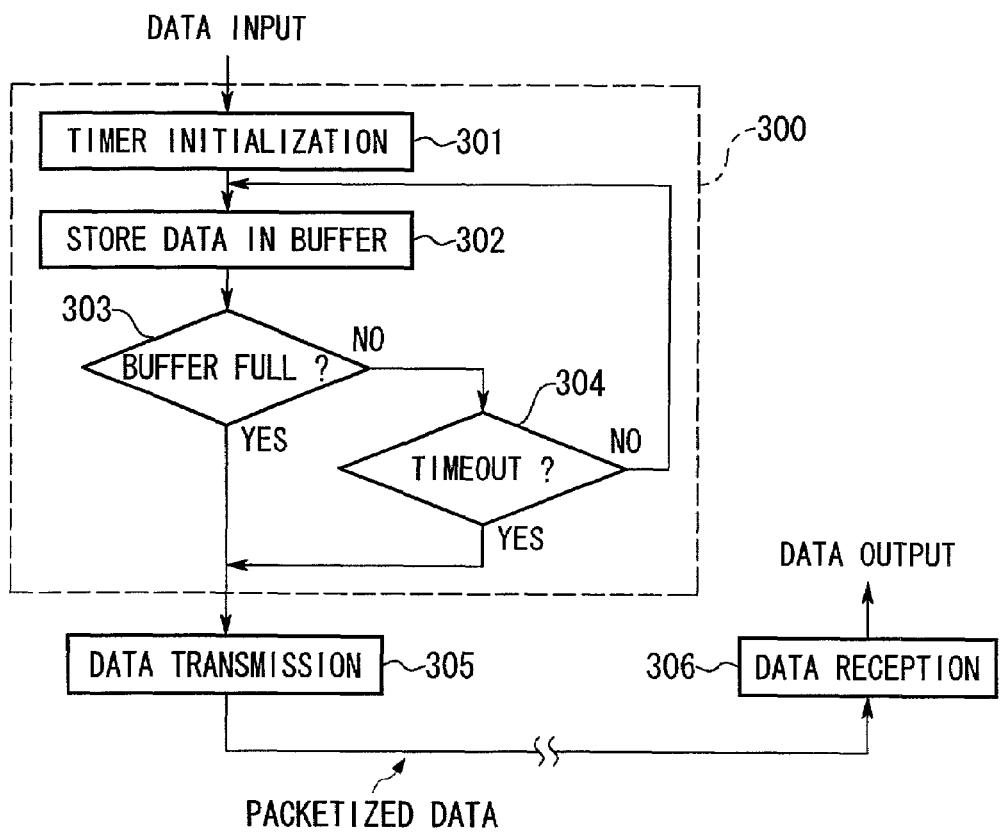
FIG. 6

COMMUNICATION METHOD AND SYSTEM FOR TRANSMISSION AND RECEPTION OF PACKETS COLLECTING SPORADICALLY INPUT DATA

BACKGROUND OF THE INVENTION

1. Field of the Invention

This invention relates to communication methods and systems for transmission and reception of packets collecting data that are input in a sporadic or discrete manner. In addition, this invention also relates to recording media that store communication programs for transmission and reception of packets collecting sporadically input data.

2. Description of the Related Art

Conventionally, there are provided various systems that collect sporadically or discretely input data into prescribed units called 'packets', which are subjected to transmission and reception in accordance with the prescribed sequence of communications. FIG. 6 shows a control flow for use in the existing communication system that is well known. Reference numeral 300 designates a packetizing process of data, wherein a timer is initialized every time data are input thereto (see step 301). In step 302, input data are collected in a buffer. Then, the data collected in the buffer are subjected to collective transmission in step 305 when the buffer is fully occupied by the input data (see step 303) or when a prescribed time period elapses after the time of inputting the last data (see step 304).

If the buffer has vacant space (or remaining capacity), even though the elapsed time counted from the timing of inputting the last data has not reached the prescribed time value, the system is set in a standby state waiting for an input of next data until a prescribed condition is established.

FIG. 7 shows relationships between input and output timings of data along with the same time axis. Reference symbol 'T' denotes a time interval for a timeout. The system inputs data D1 to D4 in a sporadic manner, wherein these data are subjected to the foregoing packetizing process to produce two pairs of data, namely a first pair of data D1 and D2 and a second pair of data D3 and D4, which are subjected to transmission as packets. Originally, the data D1 to D4 are mutually separated from each other in time by time intervals t12, t23 and t34. When the transmission unit of the system performs transmission of the aforementioned packets, it disregards time information representing the aforementioned time intervals. In the reception unit of the system, the packets are subjected to reproduction in such a manner that the original data D1 to D4 are mutually separated from each other in time by time intervals t12', t23' and t34'. That is, due to the transmission and reception, the original time intervals t12-t34 between the data D1-D4 are changed to the time intervals t12'-t34'. If data Dn (where n=1 to 4) represent performance information of a musical instrument such as MIDI data (where 'MIDI' indicates the standard for Musical Instrument Digital Interface), the conventional system cannot accurately reproduce the original time information representing mutual time intervals of data. This causes various problems in reproduction of musical information. In particular, the conventional system bears the problem that dispersions or deviations are likely to occur in delays of data due to data processing during transmission.

SUMMARY OF THE INVENTION

It is an object of the invention to provide a communication method and system that are capable of eliminating dispersions or deviations occurring in delays of data due to data processing during transmission.

It is another object of the invention to provide a recording medium that records a communication program implementing the communication method for eliminating deviations in delays of data due to data processing during transmission.

A communication system such as a server/client system provides packet communications by way of a network such as the Internet. Herein, a transmission unit (e.g., server) inputs data such as MIDI data in a sporadic manner while storing timing data representing their input timings. The sporadically input data are accumulated in a buffer memory (e.g., RAM) every prescribed time and are then subjected to packetizing. Packetized input data accompanying the timing data are transmitted to a reception unit (e.g., client), wherein they are stored in a buffer memory. Thereafter, the received input data are output at timings based on the timing data. Thus, it is possible to completely secure the same time relationship of data during transmission and reception of the sporadically input data even though the reception unit differs from the transmission unit in the time-axis basis.

The timing data are stored in a timing data register consisting of a prescribed number of bits, each of which provides a representation as to whether or not the transmission unit inputs the data at each shift timing. Both the transmission unit and the reception unit have a timing data register of the same configuration. This allows the units to secure the same time relationship of the sporadically input data even though the reception unit is not synchronized with the transmission unit.

In addition, it is possible to provide communication programs corresponding to transmission and reception of the sporadically input data. The communication programs can be recorded on desired recording media, which are installed in computer systems.

BRIEF DESCRIPTION OF THE DRAWINGS

These and other objects, aspects, and embodiments of the present invention will be described in more detail with reference to the following drawing figures, in which:

FIG. 5A is a time chart showing timings of inputting data in the server and timings of transmitting data accompanying their time data to the client;

FIG. 5B is a time chart showing timings of outputting data from the client;

FIG. 6 is a flowchart showing transmission and reception processes performed by the conventional communication system.

DESCRIPTION OF THE PREFERRED EMBODIMENTS

This invention will be described in further detail by way of examples with reference to the accompanying drawings.

Figure 1:
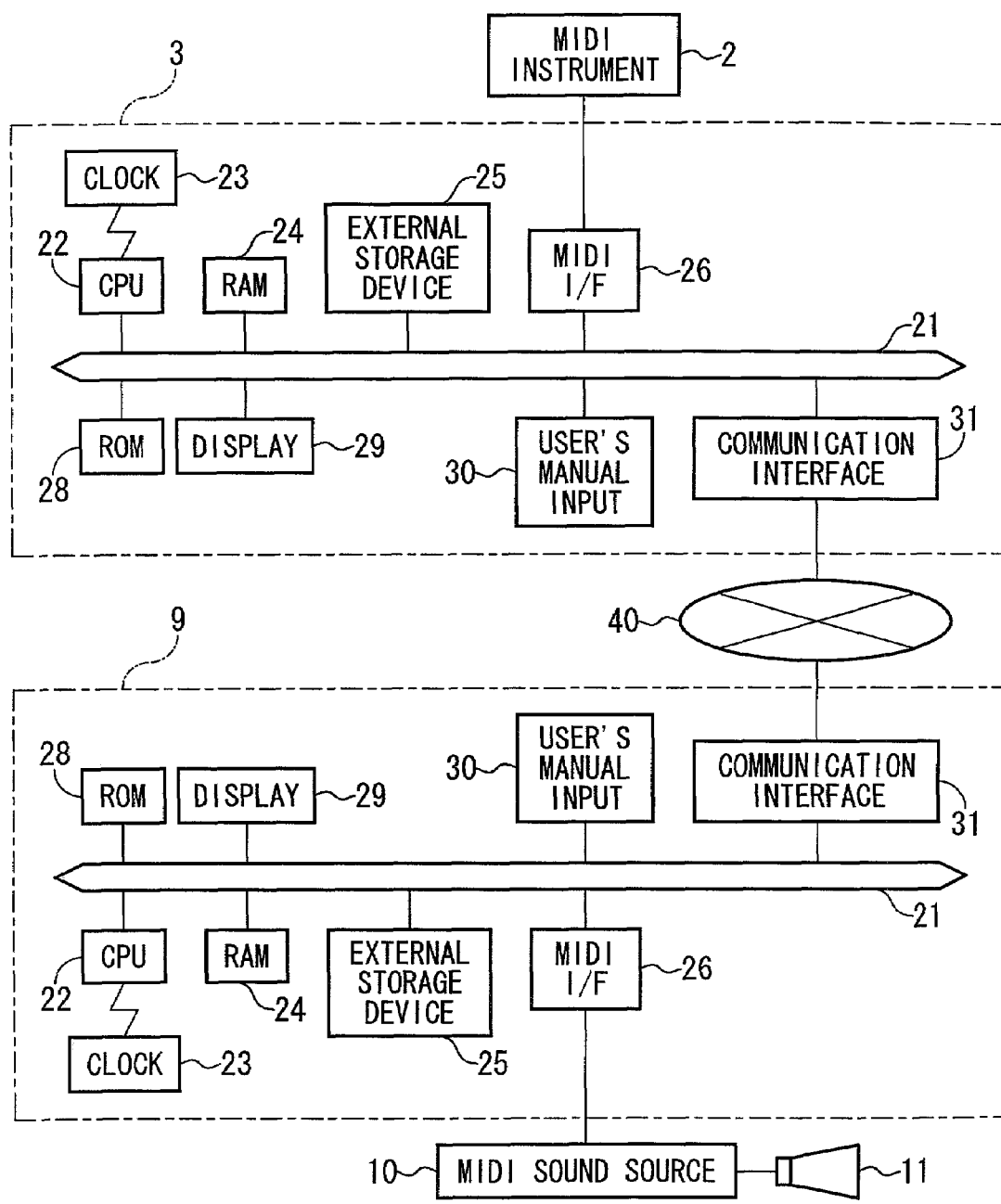
FIG. 1 is a block diagram showing a communication system corresponding to a server/client system in accordance with a first embodiment of the invention.

FIG. 1 is a block diagram showing a communication system in accordance with the first embodiment of the invention. Specifically, the communication system refers to a server/client system in which a server 3 acting as a transmission unit and a client 9 acting as a reception unit are connected together by way of a network 40 such as the Internet. Basically, both the server 3 and the client 9 have the same configuration.

The server 3 comprises a clock generator 23 for generating system clock pulses, a RAM 24, an external storage device 25, a MIDI interface (MIDI I/F) 26 for use in transmission and reception of MIDI data with an external device or system, a ROM 28, a display 29, a user's manual operator 30 such as a keyboard and a mouse, and a communication interface 31.

The MIDI interface 26 is connected with a MIDI instrument 2, that is, an electronic musical instrument that operates based on the MIDI standard. The RAM 24 comprises a buffer register for temporarily storing MIDI data input thereto from the external device or system, and a timing data register for storing timing data representing input timings of the MIDI data.

As the external storage device 25, it is possible to use various types of storage devices such as the hard-disk drive, floppy disk drive, CD-ROM drive and magneto-optical disk drive.

The communication interface 31 is used for transmission and reception of various types of data such as MIDI data, audio data and image data by way of the Internet based on an Internet Protocol (IP), for example.

The communication interface 31 has the ability to connect with various types of networks and is not necessarily limited to the prescribed interface exclusively used for connections with the Internet. Therefore, it is possible to use various types of interfaces such as the Ethernet interface, digital communication interface based on the IEEE 1394 standard ('IEEE' is an abbreviation for 'Institute of Electrical and Electronics Engineers'), and RS-232C interface.

The ROM 28 is used to store various types of programs and fixed data. That is, it stores a transmission program in which MIDI data are subjected to packetizing so that packetized data are subjected to transmission together with timing data (or time information) representing their input timings.

Next, a description will be given with respect to an internal configuration of the client 9. As described above, the client 9 is basically similar to the server 3 in configuration, wherein the same reference numerals are used. Specifically, the client 9 differs from the server 3 in three points, which will be described below.

First, the ROM 28 of the client 9 stores a reception program instead of the aforementioned transmission program with respect to MIDI data. In the reception program, the client 9 receives 'packetized' MIDI data, which are subjected to reproduction based on the aforementioned timing data (or time information) representing input timings that the server 3 inputs MIDI data.

Second, the MIDI interface 26 of the client 9 is connected with a MIDI sound source 10 coupled with a sound output device 11 such as a speaker.

Third, the RAM 24 of the client 9 comprises a buffer register for temporarily storing 'received' MIDI data and a timing data register for storing timing data (or time information) that are received together with MIDI data.

Next, a brief description will be given with respect to transmission and reception of the aforementioned server/client system. The server 3 inputs MIDI data from the MIDI instrument 2 by means of the MIDI interface 26, so that the input MIDI data are accumulated in the buffer register of the RAM 24. The input MIDI data accompany timing data representing input timings thereof in the server 3. The input MIDI data and timing data are subjected to packetizing to produce packets, which are output from the server 3 by means of the communication interface 31 and are transmitted to the client 9 by way of the network 40.

The client 9 receives the packets of MIDI data and timing data by means of the communication interface 31, wherein the received MIDI data are separated from the timing data. Based on the timing data, the client 9 outputs the received MIDI data to the MIDI sound source 10 by means of the MIDI interface 26.

The MIDI sound source 10 inputs the MIDI data to produce analog musical tone signals, which are output to the sound output device 11. Thus, the sound output device 11 such as the speaker produces musical tones based on the analog musical tone signals.

Figure 2:
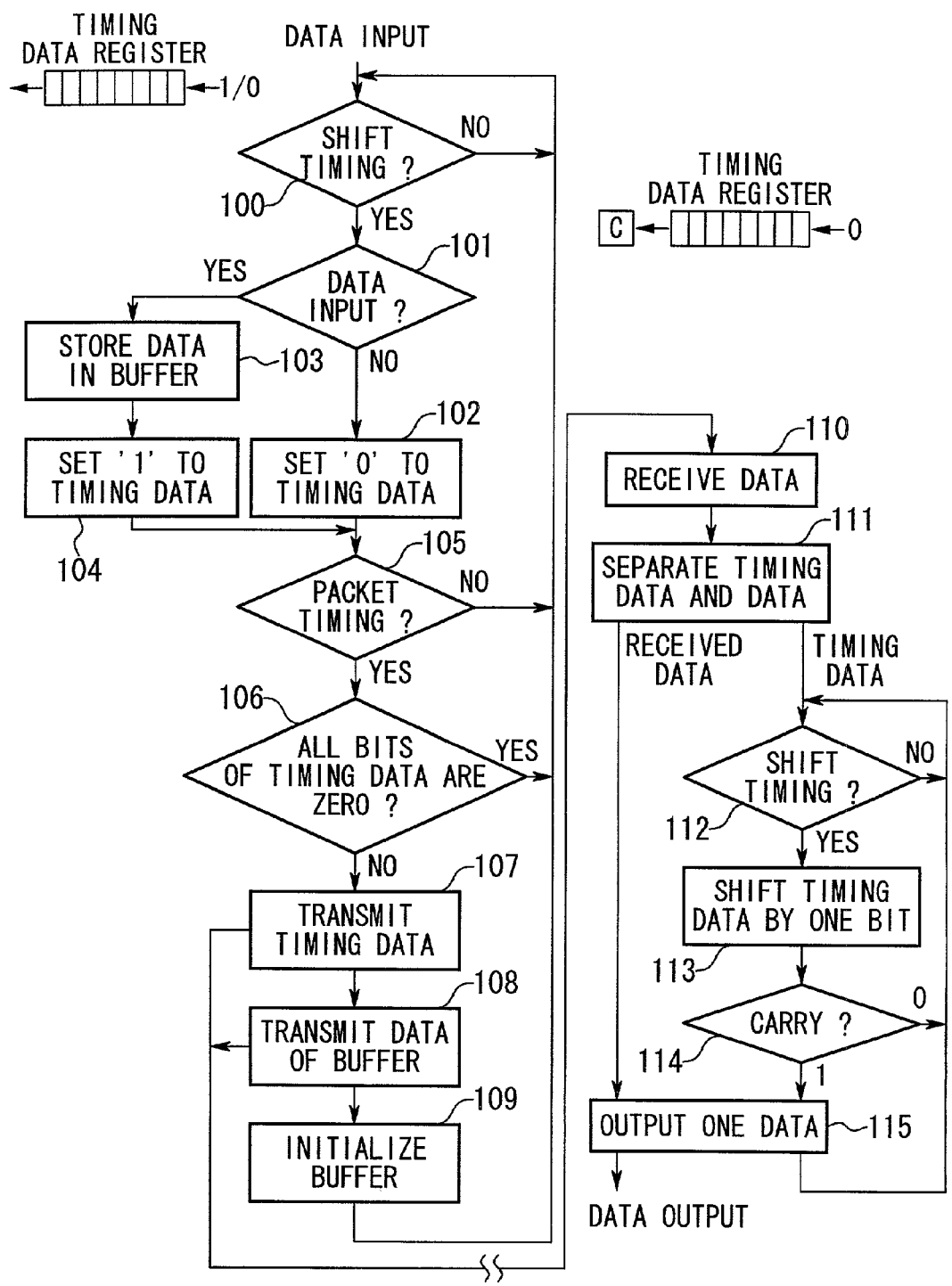
FIG. 2 is a flowchart showing transmission and reception processes performed by the server and client shown in FIG. 1.
Figure 3A:
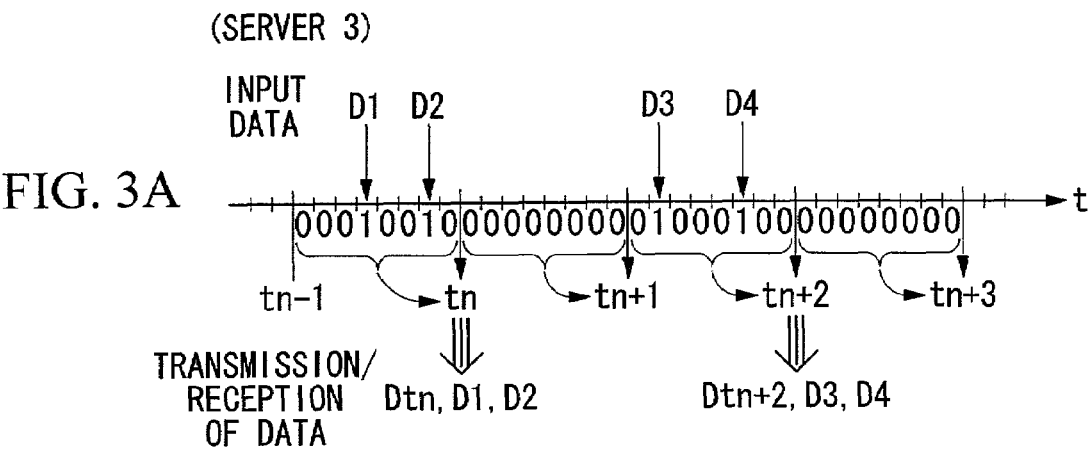
FIG. 3A is a time chart showing timings of inputting data in the server and timings of transmitting data accompanying their timing data to the client.
Figure 3B:
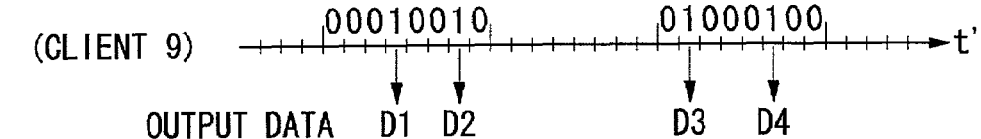
FIG. 3B is a time chart showing timings of outputting data from the client.

Next, concrete examples of operations of the aforementioned communication system of FIG. 1 will be described with reference to FIGS. 2, 3A and 3B. FIG. 2 is a flowchart that collectively shows a series of operations of the server 3 acting as the transmission unit and a series of operations of the client 9 acting as the reception unit. FIG. 3A is a time chart for the server 3, which shows a relationship between data input to the server 3, and a relationship between data that are transmitted from the server 3 and are received by the client 9. FIG. 3B is a time chart for the client 9, which shows a relationship between data output from the client 9. Timing data representing timings at which the server 3 inputs data D1-D4 are expressed by 8-bit data in the present embodiment.

For the convenience' sake, both the transmission unit and reception unit operate in synchronization with prescribed shift timings, which are switched over by 1/n of the period between packet timings. The present embodiment sets 'n' to '8'; hence, one packet timing occurs every eight shift timings.

Now, operations of the sever 3 will be described in detail with reference to a left-side part of the flowchart of FIG. 2. When the server inputs MIDI data from the MIDI instrument 2 by means of the MIDI interface 26, the flow proceeds to step 100 in which a decision is made as to whether or not the input timing matches the shift timing.

If the server 3 inputs the MIDI data at the shift timing, the flow sequentially proceeds to steps 101, 103 and 104. That is, at the input timing, the input MIDI data are stored in the buffer register of the RAM 24, while '1' is set to a first bit position of the timing data register of the RAM 24. An example of the timing data register is shown in the upper-left area of FIG. 2; that is, the timing data register is an 8-bit shift register, in which '1' set to the rightmost position is sequentially shifted to the left in synchronization with shift timings. The present embodiment reflects the input timing by the bit position of '1' in the timing data stored in the timing data register.

If the server 3 does not input the MIDI data at the shift timing, the flow sequentially proceeds to step 101 and 102, wherein '0' is set to the first bit position of the timing data register of the RAM 24. That is, the present embodiment reflects an event that no MIDI data are stored in the buffer register of the RAM 24 by the bit position of '0' in the timing data stored in the timing data register.

Due to the aforementioned operations, each of eight bit positions of the timing data register provides representation as to whether or not MIDI data are stored in the buffer register of the RAM 24 with respect to each of shift timings.

In step 105, a decision is made as to whether or not the present timing matches the packet timing, which occurs every eight shift timings. At the packet timing, the flow proceeds to step 106 in which a decision is made as to whether or not eight bits of the timing data are all zero, in other words, a decision is made as to whether or not the binary notation of the 8-bit timing data register for accumulating digits input by the preceding eight shift timings is '00000000'. If eight bits of the timing data are not all zero, the flow proceeds to steps 107 and 108 in which the server 3 reads data from the buffer register of the RAM 24, so that the read data accompanying the timing data read from the timing data register are output by means of the communication network 31. Therefore, the server 3 transmits these data to the client 9 by way of the network 40. After completion of transmission, the server 3 initializes the buffer register of the RAM 24 to clear its stored data. Then, the flow returns to step 100.

Incidentally, the flow repeats the foregoing step 100 unless the present timing matches the shift timing. In addition, if the server 3 determines in step 105 that the present timing does not match the packet timing, the flow returns to step 100. Further, if the server 3 determines in step 106 that eight bits of the timing data are all zero, the flow returns to step 100.

Next, concrete examples will be described with reference to FIG. 3A, in which shift timings are plotted on the time axis, and each packet timing occurs every eight shift timings. That is, packet timings tn−1, tn, tn+1, tn+2, and tn+3 consecutively occur on the time axis shown in FIG. 3A by respective periods. The server 3 inputs data D1 and D2 during a packet timing interval between the packet timings tn−1 and tn, during which digits '1' and '0' are accumulated in eight bits of timing data Dtn. The input data D1 and D2 (e.g., MIDI data) accompanying the timing data Dtn are collectively subjected to transmission at the packet timing tn. Herein, the timing data Dtn reads '00010010', which indicates that the data D1 is input at the shift timing corresponding to the fourth bit counted from the leftmost bit, and the data D2 is input at the shift timing corresponding to the seventh bit.

Since no data is input to the server 3 at all of eight shift timings counted from the packet timing tn to packet timing tn+1, eight bits of timing data are all set to zero. At the packet timing tn+1, the timing data whose binary notation is '00000000' are stored in the timing data register. At this time, the buffer register of the RAM 24 stores no data to be transmitted from the server 3 to the client 9.

During the next packet timing interval between packet timings tn+1 and tn+2, the server 3 inputs data D3 and D4, which are stored in the buffer register of the RAM 24 so that the timing data register stores corresponding timing data Dtn+2. The input data D3 and D4 accompanying the timing data Dtn+2 are collectively subjected to transmission at the packet timing tn+2. Herein, the timing data Dtn+2 reads '01000100', which indicates that the data D3 is input at the shift timing corresponding to the second bit counted from the leftmost bit, and the data D4 is input at the shift timing corresponding to the sixth bit.

As described above, the server 3 proceeds to collective transmission of the packet corresponding to the combination of the data D1 and D2 accompanying the timing data Dtn at the packet timing tn; thereafter, the server proceeds to collective transmission of the packet corresponding to the combination of the data D3 and D4 accompanying the timing data Dtn+2 at the packet timing tn+2.

In short, the server 3 packetizes the input data (i.e., input MIDI data) and timing data at each packet timing, so that it transmits packetized data to the client 9 (see step 108) over the network 40. Thus, the client 9 receives the packetized data consisting of the input data and timing data by means of the communication interface 31 in step 110.

In step 111, the client 9 proceeds to separation of the input data and timing data. That is, the timing data are stored in the timing data register of the RAM 24, while the received data (i.e., received MIDI data) are stored in the buffer register of the RAM 24. Each data (or each bit) of the timing data is shifted by one bit in the timing data register from the right to the left, which is shown in the upper right portion of FIG. 2 (also see steps 112 and 113). At each shift timing, the timing data register of the RAM 24 provides a carry signal 'C', which is overflowed from the leftmost bit position. Herein, the carry signal (simply called 'a carry') has a digit '1' or '0' in response to the digit located at the leftmost position of the timing data register. When a carry '1' is output from the timing data register, the client 9 reads and outputs one data from the buffer register of the RAM 24 (see steps 114 and 115). Therefore, each of the received data is to be output from the client 9 in accordance with the carry '1' from the timing data register.

When no data is registered in the buffer register of the RAM 24 in connection with each shift timing, a digit '0' is merely set to the rightmost bit position of the timing data register.

As described above, the client 9 outputs each of received data to the MIDI sound source 10 by means of the MIDI interface 26, completely in synchronization with the prescribed timing substantially corresponding to the shift timing at which the sever 3 inputs each data by the packet timing, even though the client 9 differs from the server 3 on a time-axis basis.

The above will be described in a concrete manner with respect to the packet timing interval tn−1 to tn. That is, the server 3 inputs the data D1 at the fourth shift timing counted from the packet timing tn−1; then, it inputs the data D2 at the seventh shift timing. These data D1 and D2 are transmitted to the client 9, wherein they are stored in the RAM 24 in connection with the timing data Dtn. Thereafter, the client 9 outputs the data D1 at the fourth shift timing that is counted from the prescribed packet timing substantially matching the packet timing tn−1; then, it outputs the data D2 at the seventh shift timing. Therefore, an original time interval between the input data D1 and D2 input to the server 3 is completely secured in the client 9, which outputs the data D1 and D2 to the MIDI sound source 10.

Similarly, the server 3 inputs the data D3 at the second shift timing counted from the packet timing tn+1; then, it inputs the data D4 at the sixth shift timing. These data D3 and D4 are transmitted to the client 9, wherein they are stored in the RAM 24 in connection with the timing data Dtn+2. Thereafter, the client 9 outputs the data D3 at the second shift timing that is counted from the prescribed packet timing substantially matching the packet timing tn+1; then, it outputs the data D4 at the sixth shift timing. Therefore, an original time interval between the input data D3 and D4 input to the server 3 is completely secured in the client 9, which outputs the data D3 and D4 to the MIDI sound source 10.

Upon receipt of the aforementioned data (e.g., MIDI data D1-D4), the MIDI sound source 10 produces analog musical tone signals, which are supplied to the sound output device 11. Thus, the sound output device 11, such as a speaker, produces corresponding musical tones.

The operations of the communication system of the present embodiment will be summarized as follows:

Upon inputting data in a sporadic manner, the transmission unit transmits these data accompanying time information representing their input timings. The reception unit receives these data accompanying the time information. Then, the reception unit outputs these data at optimal timings completely guaranteeing their time relationships based on the time information. Due to data processing performed by the transmission unit and reception unit, dispersions may occur in delays of data and badly affect the accuracy of reproduction of data. The present embodiment can eliminate such dispersions in delays of data even though the transmission unit differs from the reception unit on a time-axis basis.

Figure 4:
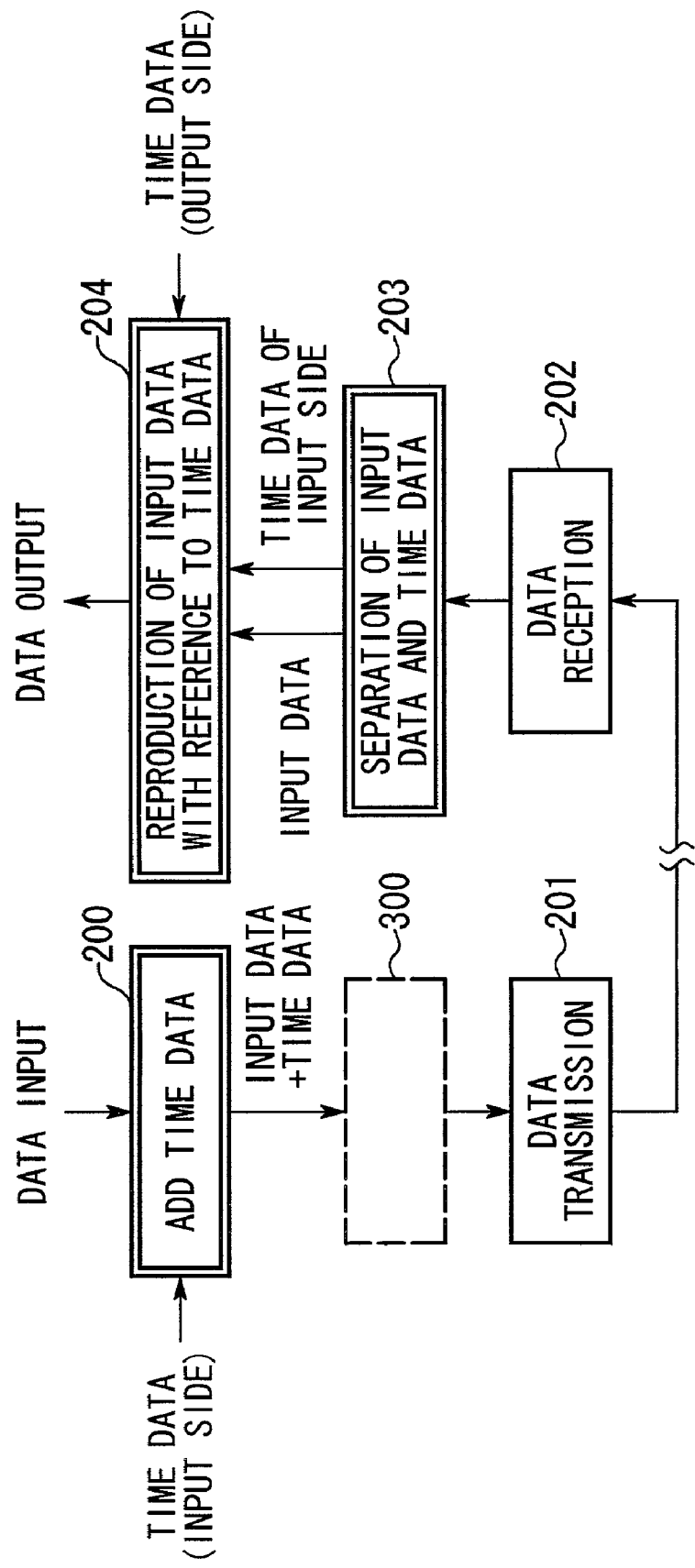
FIG. 4 is a simplified flowchart showing transmission and reception processes performed by the server and client in accordance with a second embodiment of the invention.
Figure 7:
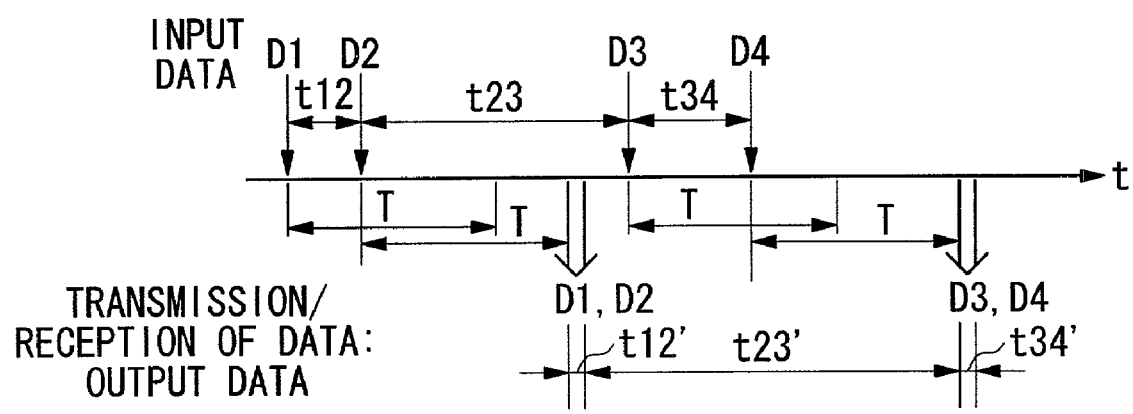
FIG. 7 is a time chart showing input and output timings of data by the conventional communication system.

Next, a communication system of a second embodiment of the invention will be described with reference to FIGS. 4 and 5. The communication system of the second embodiment has the same system configuration of the foregoing first embodiment shown in FIG. 1; hence, the duplicate description thereof will be omitted. FIG. 4 shows a simple flow for processes and steps of the communication system of the second embodiment. When the server 3 inputs MIDI data from the MIDI instrument 2, the flow proceeds to step 200 in which the server 3 provides the MIDI data with time data representing its input timing. Then, the server 3 performs a process 300, details of which are shown in FIG. 6. That is, after initialization of a timer of the server 3 in step 301, the flow proceeds to step 302 in which the input data accompanying its time data are stored in the buffer register of the RAM 24. If the buffer register is fully occupied by previously input data, the server 3 proceeds to data transmission to the client 9 (see steps 303, 305 and 201). Even if the buffer register is not fully occupied by previously input data, the server 3 proceeds to data transmission to the client 9 when the elapsed time counted from the input timing of the last input data reaches the prescribed time value (namely, 'timeout' condition) (see steps 303, 304, 305 and 201). In short, the process 300 controls the server 3 in such a manner that the input data accompanying its time data are stored in the buffer register of the RAM 24 only when the input timing of the last input data does not meet the timeout condition while the buffer register is not fully occupied by previously input data.

With reference to FIG. 5A, the server 3 inputs MIDI data D1 and D2 at timings t1 and t2 respectively. At the packet timing, the server 3 collectively transmits to the client 9 the data D1 accompanying its time data t1 and the data D2 accompanying its time data t2. Similarly, the server inputs MIDI data D3 and D4 at timings t3 and t4 respectively. At the next packet timing, the server 3 collectively transmits to the client 9 the data D3 accompanying its time data t3 and the data D4 accompanying its time data t4.

After completion of the data transmission in step 201 or 305, the flow proceeds to step 202 or 306, wherein the client 9 receives 'packetized' data from the server 3. Then, the flow proceeds to step 203 in FIG. 4, wherein the client 9 proceeds to separation of the received data (e.g., D1, D2, . . . ) and time data (e.g., t1, t2, . . . ), so that the received data are stored in the buffer register of the RAM 24 while the time data are stored in the timing data register.

In step 204, the data are read and output from the buffer register of the RAM 24 in such a manner that the mutual time relationship therebetween will be regenerated on the basis of the time data stored in the timing data register and the reference time data generated by the clock generator 23 of the client 9.

As a result, the client 9 is capable of outputting data at optimal timings while maintaining their mutual time relationships, and this will be described with reference to FIG. 5B. That is, a time interval between the input timings t1 and t2 of the data D1 and D2 in the server 3 can be completely maintained between output timings t1' and t2' at which the client 9 outputs the data D1 and D2 respectively. Similarly, a time interval between the input timings t3 and t4 of the data D3 and D4 can be completely maintained between output timings t3' and t4' at which the client 9 outputs the data D3 and D4 respectively.

As described above, the communication system of the second embodiment is capable of demonstrating similar effects of the foregoing communication system of the first embodiment, which has been described with reference to FIGS. 1, 2, 3A, and 3B.

As compared with the second embodiment, the first embodiment is reduced in amounts of time data, which are accompanied to MIDI data. Particularly, such reduction yields remarkable effects in transmission ability as input data are highly concentrated. Therefore, it is possible to reduce deterioration in the transmission ability of transmission lines (e.g., the network) by reducing time data accompanied to MIDI data or the like.

It is possible to realize communication programs based on the aforementioned processes of the server 3 and client 9 shown in FIG. 2 (i.e., steps 110-115), so that the communication programs are recorded on recording media. Installing such recording media in computer systems, it is possible to easily carry out functions of the server 3 and client 9 respectively.

The communication programs are described with respect to the communication system in which sporadically input data are subjected to transmission together with timing data representing their input timings by the transmission unit and are then received by the reception unit. Specifically, a communication program realizing functions of the transmission unit is recorded on a computer-readable recording medium, which is loaded into a computer system. Therefore, the computer system can carry out functions of the transmission unit by running the communication program. Specifically, the communication program realizes three functions of the transmission unit as follows:

(i) A function of a buffer memory that is initialized every predetermined time to accumulate data input thereto in a sporadic manner during the predetermined time.

(ii) A function of a timing data register that stores timing data representing input timings of the data.

(iii) A function of a controller that checks stored content of the timing data register every predetermined time, wherein if it exists, the timing data are read from the timing data register while the corresponding data are read from the buffer memory, so that the read data are subjected to transmission.

In addition, another communication program realizing functions of the reception unit is recorded on a computer-readable recording medium, which is loaded into a computer system. Therefore, the computer system can carry out functions of the reception unit by running the communication program. Specifically, the communication program realizes three functions of the reception unit as follows:

(i) A function of a receiver that receives the aforementioned data and timing data transmitted thereto.

(ii) A function of a timing data register that stores the timing data separated from the received data.

(iii) A function of a controller that regenerates the input timings of the data based on the timing data stored in the timing data register, so that the received data are output in response to the input timings.

In the above, the term 'computer system' may not be narrowly interpreted as a computer but embraces the hardware such as peripheral devices and the software such as operating systems (OS) and applications. In addition, the term 'computer-readable recording medium' embraces various types of storage devices such as floppy disks, magneto-optical disks, memories (e.g., ROM), and portable media (e.g., CD-ROM) as well as hard disks installed in the computer system.

Incidentally, the communication programs are not necessarily described to realize all functions of the transmission and reception units. That is, it is possible to describe the communication programs to realize prescribed parts of the functions of the transmission and reception units. In this case, the communication programs construct so-called differential files (or differential programs) that describe only supplementary functions, which are combined with preset programs of the computer systems to realize the complete functions of the transmission and reception units.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A communication method that is executed by a transmission unit and a reception unit, comprising:

packetizing one or more items of sporadically input data to accompany timing information representing respective input timings of the one or more items of sporadically input data, said timing information being in the form of a plurality of bits, wherein:

each one of said plurality of bits is periodically produced and takes on either a first binary value or a second binary value that is different from the first binary value; and for each periodically-produced bit, a bit value equal to the first binary value represents a timing at which one of said items of sporadically input data is inputted to the transmission unit, and a bit value equal to the second binary value represents a timing at which no data is inputted to the transmission unit;

transmitting the packetized data along with the timing information from the transmission unit;

receiving the packetized data along with the timing information by the reception unit; and outputting the packetized data as output data at timings based on the timing information from the reception unit, wherein, for each bit of the received timing information, when the bit value is equal to the first binary value, a corresponding item of the packetized data is outputted by the reception unit, and when the bit value is equal to the second binary value, no data is outputted by the reception unit, such that respective timings of the output data correspond to said respective input timings of the sporadically input data.

2. A communication method according to claim 1, wherein the sporadically input data correspond to MIDI data that are produced and input to the transmission unit in a sporadic manner.

3. A communication method according to claim 1, wherein the transmission unit transmits the packetized data along with the timing information to the reception unit via a network.

4. A communication system comprising:

a transmission unit for packetizing one or more items of sporadically input data to accompany timing information representing respective input timings of the one or more items of sporadically input data and for transmitting the packetized data along with the timing information corresponding thereto, said timing information being in the form of a plurality of bits, wherein:

each one of said plurality of bits is periodically produced and takes on either a first binary value or a second binary value that is different from the first binary value; and for each periodically-produced bit, a bit value equal to the first binary value represents a timing at which one of said items of sporadically input data is inputted to the transmission unit, and a bit value equal to the second binary value represents a timing at which no data is inputted to the transmission unit; and a reception unit for receiving the packetized data along with the timing information from the transmission unit, wherein said reception unit outputs the packetized data as output data at timings based on the timing information such that, for each bit of the received timing information, when the bit value is equal to the first binary value, a corresponding item of the packetized data is outputted by the reception unit, and when the bit value is equal to the second binary value, no data is outputted by the reception unit, and respective timings of the output data correspond to said respective input timings of the sporadically input data.

5. A communication system according to claim 4, wherein the sporadically input data correspond to MIDI data that are produced and input to the transmission unit in a sporadic manner.

6. A communication system according to claim 4, wherein the transmission unit transmits the packetized data along with the timing information to the reception unit via a network.

7. A transmission unit for use in a communication system performing packet communications, comprising:

an input device for sporadically inputting data;

a buffer memory for accumulating the sporadically input data, wherein the buffer memory is periodically initialized;

a timing data register for storing timing data, said timing data being in the form of a plurality of bits, wherein:

each one of said plurality of bits is periodically produced and takes on either a first binary value or a second binary value that is different from the first binary value; and for each periodically-produced bit, when an item of said sporadically input data is inputted to the buffer memory, the timing data register stores the first binary value for said periodically-produced bit as a representation of the input timing of said item of sporadically input data, and when no item of data is inputted to the buffer memory, the timing data register stores the second binary value for said periodically-produced bit; and a controller for periodically checking the timing data stored in the timing data register such that, when, for a given time interval, the bit value corresponding to one of the plurality of bits of the stored timing data is equal to the first binary value, the sporadically input data stored in the buffer memory are packetized and subjected to transmission along with the timing data in said time interval.

8. The transmission unit according to claim 7, wherein the given time interval corresponds to a packet timing that occurs by a prescribed number of shift timings in correspondence with the plurality of bits forming the timing data.

9. The transmission unit according to claim 7, wherein the timing data register is a shift register for storing said plurality of bits of the timing data.

10. The transmission unit according to claim 7, wherein the sporadically input data correspond to MIDI data that are produced and input in a sporadic manner.

11. The transmission unit according to claim 7, wherein the packetized data are subjected to transmission along with the timing data via a network.

12. A reception unit for use in a communication system performing packet communications, comprising:
   a receiver for receiving, from a transmission unit, packetized data accompanied by timing data corresponding thereto, said packetized data including one or more items of data sporadically inputted into said transmission unit and said timing data being in the form of a plurality of bits, wherein:
      each one of said plurality of bits is periodically produced and takes on either a first binary value or a second binary value that is different from the first binary value; and
      for each periodically-produced bit, a bit value equal to the first binary value represents a timing at which one of said items of the sporadically input data is inputted to the transmission unit, and a bit value equal to the second binary value represents a timing at which no data is inputted into the transmission unit;
   a buffer memory for accumulating the packetized data received by the receiver;
   a timing data register for storing the timing data received by the receiver; and
   a controller for periodically processing the timing data such that, for each bit of the timing data, when the bit value of the timing data is equal to said first binary value, the item of packetized data corresponding thereto is read from the buffer memory and outputted, and when the bit value of the timing data is equal to said second binary value, no data is read from the buffer memory.

13. The reception unit according to claim 12, wherein the timing data register is a shift register for storing said plurality of bits of the timing data.

14. The reception unit according to claim 12, wherein the sporadically input data correspond to MIDI data that are produced and input to the transmission unit in a sporadic manner.

15. The reception unit according to claim 12, wherein the receiver receives from the transmission unit the packetized data along with the timing data via a network.

16. A computer-readable recording medium storing a communication program which when executed causes a computer to perform a transmission method for use in a communication system performing packet communications, said transmission method comprising:
   sporadically inputting data;
   accumulating the sporadically input data in a buffer memory that is periodically initialized;
   storing timing data representing respective input timings of one or more items of the sporadically input data by a timing data register, said timing data being in the form of a plurality of bits, wherein:
      each one of said plurality of bits is periodically produced and takes on either a first binary value or a second binary value that is different from the first binary value; and
      for each periodically-produced bit, when an item of said sporadically input data is inputted to the buffer memory, the timing data register stores the first binary value for said periodically-produced bit as a representation of the input timing of said item of sporadically input data, and when no item of data is inputted to the buffer memory, the timing data register stores the second binary value for said periodically-produced bit;
   periodically checking the timing data stored in the timing data register and, when, for a given time interval, the bit value corresponding to one of the plurality of bits of the stored timing data is equal to the first binary value, packetizing the sporadically input data stored in the buffer memory; and
   transmitting the packetized data along with the timing data in said time interval.

17. The computer-readable recording medium according to claim 16, wherein the sporadically input data correspond to MIDI data that are produced and input in a sporadic manner.

18. The computer-readable recording medium according to claim 16, wherein the packetized data are subjected to transmission along with the timing data via a network.

19. A computer-readable recording medium storing a communication program which when executed causes a computer to perform a reception method for use in a communication system performing packet communications, said reception method comprising:
   receiving, from a transmission unit, packetized data accompanied by timing data corresponding thereto, said packetized data including one or more items of data sporadically inputted into said transmission unit and said timing data being in the form of a plurality of bits, wherein:
      each one of said plurality of bits is periodically produced and takes on either a first binary value or a second binary value that is different from the first binary value; and
      for each periodically-produced bit, a bit value equal to the first binary value represents a timing at which one of said items of the sporadically input data is inputted to the transmission unit, and a bit value equal to the second binary value represents a timing at which no data is inputted into the transmission unit;
   accumulating the received packetized data by a buffer memory;
   storing the received timing data in a timing data register; and outputting, as output data, the packetized data such that, for each bit of the timing data, when the bit value of the timing data is equal to said first binary value, the item of packetized data corresponding thereto is read from the buffer memory and outputted, and when the bit value of the timing data is equal to said second binary value, no data is read from the buffer memory.

20. The computer-readable recording medium according to claim 19, wherein the sporadically input data correspond to MIDI data that are produced and input in a sporadic manner.

21. The computer-readable recording medium according to claim 19, wherein the packetized data are received along with the timing data via a network.

22. The transmission unit according to claim 7, wherein the first binary value is "1" and the second binary value is "0".

23. The reception unit according to claim 12, wherein the first binary value is "1" and the second binary value is "0".

* * * * *